US010878471B1

(12) United States Patent
Ahuja et al.

(10) Patent No.: US 10,878,471 B1
(45) Date of Patent: Dec. 29, 2020

(54) CONTEXTUAL AND PERSONALIZED BROWSING ASSISTANT

(71) Applicant: Amazon Technologies, Inc., Seattle, WA (US)

(72) Inventors: Sohel Ahuja, Redmond, WA (US); Stephen David Avalone, Seattle, WA (US); Matthew Ryan Fielden, Shoreline, WA (US); Samuel Scott Gigliotti, Seattle, WA (US); Adrien Guerard, Philadelphia, PA (US); Julian Embry Herwitz, Seattle, WA (US); Jessica Nicole Jenks, Seattle, WA (US); Siddharth Natarajan, Seattle, WA (US); Alexander Roy Wishkoski, Seattle, WA (US); Alexander Jonathan Pinkus, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 803 days.

(21) Appl. No.: 14/975,480

(22) Filed: Dec. 18, 2015

(51) Int. Cl.

| | |
|---|---|
| ***G06Q 30/00*** | (2012.01) |
| ***G06Q 30/06*** | (2012.01) |
| ***G06F 16/248*** | (2019.01) |
| ***G06F 16/955*** | (2019.01) |
| ***G06F 16/9535*** | (2019.01) |
| ***G06F 16/2457*** | (2019.01) |

(52) U.S. Cl.
CPC ....... *G06Q 30/0623* (2013.01); *G06F 16/248* (2019.01); *G06F 16/24575* (2019.01); *G06F 16/955* (2019.01); *G06F 16/9535* (2019.01)

(58) Field of Classification Search
None
See application file for complete search history.

(56) References Cited

U.S. PATENT DOCUMENTS

| | | | | |
|---|---|---|---|---|
| 8,538,829 | B1 * | 9/2013 | Hu | G06Q 10/087 705/26.1 |
| 2003/0045950 | A1 * | 3/2003 | Bronikowski | G05B 19/0426 700/83 |
| 2006/0224617 | A1 * | 10/2006 | Inmon | G06Q 10/10 |
| 2013/0040633 | A1 * | 2/2013 | Leeder | H04W 4/60 455/422.1 |

(Continued)

OTHER PUBLICATIONS

Rhodes, B.J., Just-in-Time Information Retrieval Agents, Jan. 1, 2000, IMB Systems Journal, vol. 39, pp. 685-704 (Year: 2000).*

*Primary Examiner* — Michael Misiaszek
*Assistant Examiner* — Timothy J Kang
(74) *Attorney, Agent, or Firm* — Kilpatrick Townsend & Stockton LLP

(57) ABSTRACT

Embodiments are described for implementing a contextual browsing assistant service. In accordance with at least one embodiment, event data comprising content being presented via an interface of a system may be obtained. First information about the content may be extracted from the event data. In embodiments, the first information about the content may be extracted utilizing a content extractor. An item included in the first information may be identified based on a comparison of the first information and second information that identifies a plurality of items offered by an electronic marketplace. In an embodiment, third information about the identified item may be presented via the interface.

19 Claims, 10 Drawing Sheets

700

Obtain accessibility event data comprising content being viewed on a user device — 702

Identify a format of the accessibility event data — 704

Extract the content from the accessibility event data in response to receiving content extractors — 706

Requesting an identification of items included in the extracted content — 708

Receiving information about the items — 710

Generating a notification comprising the identified items and the information about the items — 712

(56) References Cited

U.S. PATENT DOCUMENTS

| | | | | |
|---|---|---|---|---|
| 2015/0066897 | A1* | 3/2015 | Vronay | G06F 17/30029 707/710 |
| 2015/0331936 | A1* | 11/2015 | Alqadah | G06F 17/277 707/739 |
| 2016/0055256 | A1* | 2/2016 | Look | G06F 17/30893 715/205 |
| 2016/0173503 | A1* | 6/2016 | Knight | H04L 63/105 726/26 |
| 2017/0085591 | A1* | 3/2017 | Ganda | H04L 63/20 |

* cited by examiner

Native Browsing Application 200

204

206

EuroCoffee "One"
Espresso Maker
$19.99
QuickShip Available
208

EuroCoffee has a 7 out of 10 review rating according to users of Online Marketplace.
EuroCoffee is available from an Online Marketplace, click here to be directed to where you can order the EuroCoffee for delivery or swipe down to dismiss this notification. 210

CONTEXTUAL AND PERSONALIZED BROWSING ASSISTANT

BACKGROUND

Advances in mobile technology and network technology have allowed consumers to browse and shop from a number of vendors online or via the Internet while they are commuting, traveling, etc. A consumer may casually browse through a number of items offered by a particular vendor or they may search for a particular item from any available vendor. However, even with the aforementioned advances consumers may be frustrated while browsing and/or shopping by the limited viewing and/or interacting space made available on user devices such as mobile phones or tablets. Consumers may prematurely purchase an item from one vendor only to continue searching and find the same item available at a better price point from another vendor. Consumers may attempt to comparison shop by interacting with multiple vendors at once but this can lead to further frustration and confusion.

BRIEF DESCRIPTION OF THE DRAWINGS

Various embodiments in accordance with the present disclosure will be described with reference to the drawings, in which:

FIG. 2 illustrates an example user interface, via a native application on a user device, depicting features of a contextual browsing assistant service as described herein, in accordance with at least one embodiment;

DETAILED DESCRIPTION

Figure 1:
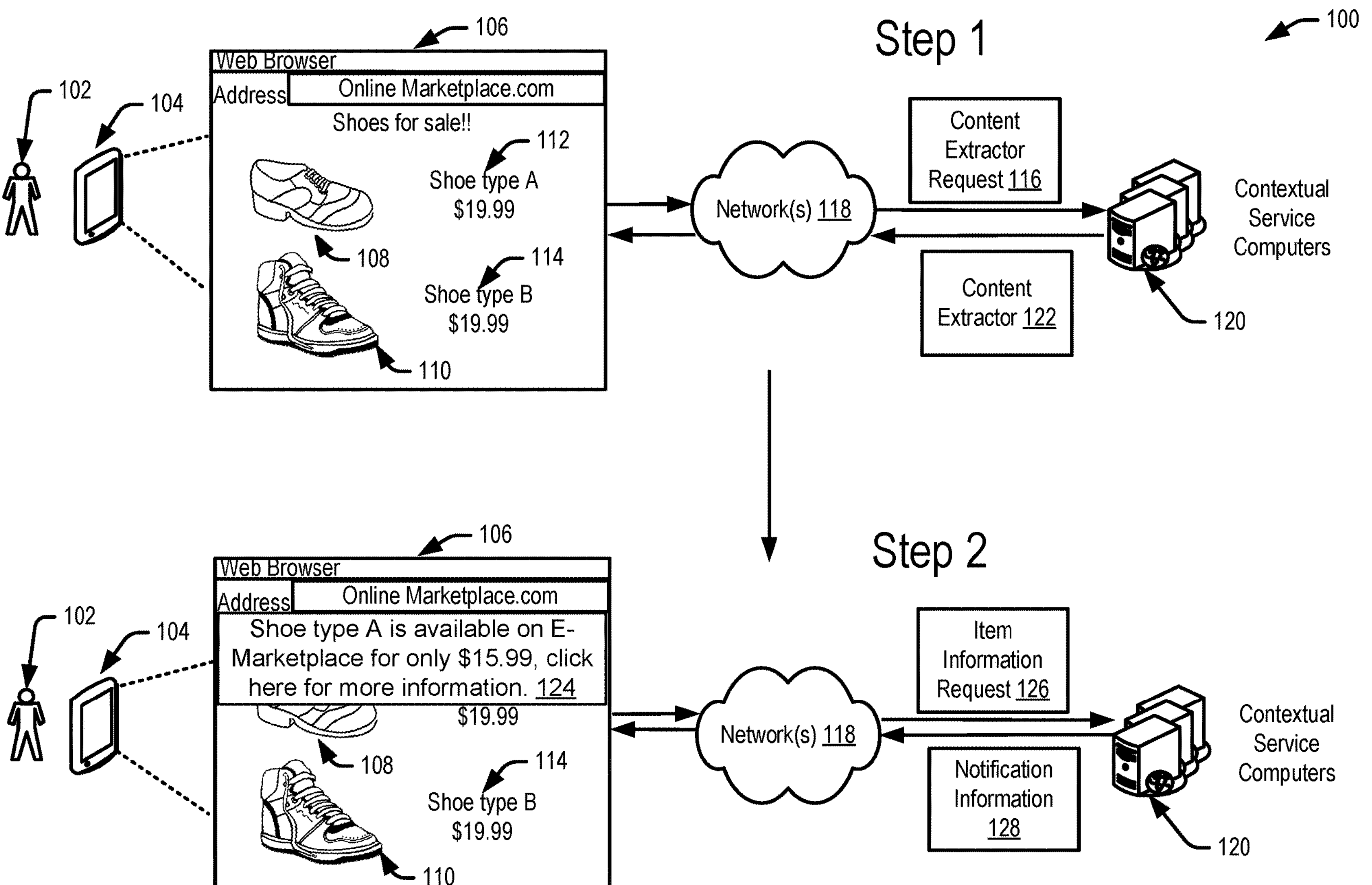
FIG. 1 illustrates an example workflow for a contextual browsing assistant service as described herein, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein include systems and methods for providing a contextual browsing assistant service to users/consumers. In embodiments, features of the contextual browsing assistant service enable users to have a personalized shopping experience by providing contextual alerts or notifications that include information about an item or service that they are currently viewing or browsing. The contextual notification may indicate that the same item is offered by a different vendor and for a lower price. The user's shopping experience may be enhanced just by being informed of the availability of the item being offered by different vendors absent any price benefits. The contextual notification may be configured to direct a user to a native application or web page portal for providing purchasing information and ordering the item or service offered by the different vendor. In accordance with at least one embodiment, the contextual browsing assistant service may utilize event data obtained by a user's device to generate and provide the contextual notification without the user having to request a specific action or provide any specific input. For example, the event data may include a web page that further includes images and text relating to an item that the user is currently browsing and/or viewing via their device. The contextual browsing assistant service may utilize the event data and generate content that includes information about the same item offered by a different vendor. The content can be presented in such a way as to enable the user to easily comparison shop between vendors as described herein. In accordance with at least one embodiment, the contextual notification saves display space on the user's device and reduces intrusion by being configured to display as an overlay or content strip that can be easily dismissed by the user (such as by utilizing a swipe motion with a touch interface of the user device).

In embodiments, the contextual notifications may be dynamically generated as the user views or browses to new items, performs searches, or interacts with native applications for shopping and/or browsing of items and services. The contextual notifications may be provided to the user based on their current context and shopping intent in order to augment their existing shopping workflow. In accordance with at least one embodiment, some of the components for implementing the contextual browsing assistant service may be stored on the user device that communicates with other components, via available networks, with other components of the contextual browsing assistant service. The separation of the components can serve to protect the privacy of users regarding their shopping/browsing activities while still allowing for contextual notifications to be provided to the user and reduce resource usage of the user device. In embodiments, the contextual notification may be configured to enable the user to save an item or service included in the notification for later viewing such as by saving it to a wish list, or by generating a comparative list that includes offers for the item and/or service from multiple vendors. In accordance with at least one embodiment, the contextual notification may include information about an item being currently viewed or browsed by the user that includes user reviews of the item as provided by users associated with the different vendor, photos of the item, details of the item, or links that direct the user to other applications or web pages for further action as described herein (wish list or comparative list).

In a non-limiting example, a user may be viewing, on their mobile phone, details about a particular shoe on a native application provided by a particular vendor that offers the particular shoe. Data about the viewing session may be obtained by components of the contextual browsing assistant service on the mobile phone that can extract content and identify items included in the viewing session. Additional information may be communicated, via available networks, by other components of the contextual browsing assistant service that can be utilized to generate and present a contextual notification to the user. For example, as the user is viewing the particular shoe via their mobile phone a notification may appear as an overlay over the native application informing the user that the particular shoe is available for ordering from a different vendor and at a better price. The user may interact with the notification to be presented with more information about the particular shoe offered by the different vendor or the user can interact with the notification to dismiss or close the notification and continue shopping via the native application.

FIG. 1 illustrates an example workflow 100 for a contextual browsing assistant service as described herein, in accordance with at least one embodiment. The workflow 100 of FIG. 1 includes two steps. Step 1 depicts a user 102 interacting with a user device 104 (such as a mobile phone) to view a web browser 106 that is presenting information about shoes 108-114 such as images of shoes 108 and 110 or ordering information about the shoes 112 and 114. The viewing session of the user 102 viewing the information about the shoes 108-114 via the web browser on user device 104 may be obtained by components of the contextual browsing assistant service on the user device 104 as event data and analyzed for content that includes items or services that are currently being browsed or viewed by the user on mobile device 104 and web browser 106. In accordance with at least one embodiment, event data can include web browsing events including uniform resource locator (URL) information, HyperText Markup Language (HTML) information, Extensible Markup Language (XML) information, plain text information, image information, video information, accessibility event information, operating system level event information, or other suitable information that can be obtained from a user's browsing/shopping session. Components of the contextual browsing assistant service are configured to obtain and process the plurality of content types associated with the event data described herein and request appropriate content extractors for extracting content of interest that may be utilized to find matching items offered by a different vendor for comparison shopping purposes.

In embodiments, the components of the contextual browsing assistant service may include a contextual software core and contextual software wrapper as described herein. The contextual software wrapper and contextual software core may be configured to consume the event data and request content extractors (content scraper) 116 via available networks 118 from other components of the contextual browsing assistant service that are implemented by contextual service computers 120. The contextual service computers 120 may provide particular content extractors 122 to the user device 104 and appropriate components for extracting content from the event data and identifying items and information about the items 108-114. In embodiments, the contextual service computers 120 may select the appropriate content extractor 122 based on a format type associated with the event data. In accordance with at least one embodiment, further communication may occur between components of the contextual browsing assistant service of the user device 104 and contextual service computers 120, via the networks 118, to determine if a match between the items (shoes 108 and 110) and a plurality of items offered by an online marketplace associated with the contextual browsing assistant service, as described herein. If a match does exist then the workflow 100 proceeds to step 2.

Step 2 depicts the user 102 being presented a contextual notification 124 that includes information about one of the items (shoe 108) being offered by a different vendor and for a better price. In embodiments, the contextual notification 124 may be configured to direct the user to more information about this offer and/or allow the user to purchase the item 108 from the different vendor as indicated by the contextual notification 124. In accordance with at least one embodiment, the contextual notification 124 is presented as an overlay or content strip over the web browser 106 shopping session. The contextual notification 124 may be presented as a content strip to reduce the display space required to inform the user, to allow for comparison shopping between the item included in the contextual notification 124 and the items (108-114), and for easy dismissal or to decline the contextual notification 124. The contextual notification 124 may be configured to enable a user to move the contextual notification 124 within the viewing space of their current viewing and/or browsing session for easier comparative shopping.

As used herein, a content strip refers to a user interface element that is configured to be presented in a non-intrusive or disruptive way in a web browser of a user device or a native application of the user device. The non-intrusive and non-disruptive nature of the content strip may be based at least in part on information obtained from the event data including viewing space available and/or specific details of the user device 104. The contextual notification 124 is depicted in FIG. 1 as an overlay and obscuring some of the information about the items 108 and 112 to illustrate the informative nature of the contextual notification 124 without completely disrupting the previous shopping or browsing session of the user 102. In accordance with at least one embodiment, the contextual notification 124 may be generated based on the components of the contextual browsing assistant service on the user device 102 requesting item information 126 from the components of the contextual service computers 120 as described herein. In embodiments, the contextual service computers 120 may identify information about the items that were matched (as described in STEP 1) for inclusion in notification information 128. The contextual service computers 120 may have access to information about the plurality of items offered by an online marketplace or vendor that is associated with the contextual browsing assistant service. The contextual service computers 120 may provide the notification information 128 including the item details for any matching items to the components of the user device 102. As described herein, the components of the contextual browsing assistant service of the user device 104 may generate and present the contextual notification 124 as illustrated in FIG. 1 Step 2.

FIG. 2 illustrates an example user interface, via a native application on a user device, depicting features of a contextual browsing assistant service as described herein, in accordance with at least one embodiment. The user interface 200 of FIG. 2 may be presented via a user device 202 (such as a mobile phone) and present information from a native application 204 of the user device 202. For example, FIG. 2 illustrates the user interface 200 of an application 204

("Native Browsing Application"). The user interface 200 includes an image of an item 206 and information 208 about the viewed item including item details such as the name of the item, price of the item, and delivery options. The user interface 200 depicts a contextual notification 210 being presented via the user interface 200. The contextual notification 210 includes information about an item match offered by another vendor (Online Marketplace as opposed to Native Browsing Application), and informs the user to interact with the contextual notification 210 to be directed to where they can order the EuroCoffee for delivery. Further, the contextual notification 210 includes review information about the EuroCoffee from users associated with the Online Marketplace. In embodiments, a user may interact with the contextual notification 210 to be presented with additional information such as detailed reviews and item specifications. In an embodiment, a user may interact with contextual notification 210 to expand the contextual notification 210 to be presented with additional information about the EuroCoffee.

The contextual notification 210 may also inform the user that they may dismiss the contextual notification 210 by interacting with it such as by swiping the user interface element of the contextual notification 210 in a certain direction by utilizing a touch interface of the user device 202. In accordance with at least one embodiment, the contextual notification 210 is configured to be presented as an operating system level event notification which can display and present to a viewing user without disrupting the native application 204 or components of the native application 204. By utilizing an operating system level event notification the contextual browsing assistant service may provide information that a user can utilize for comparison shopping without interrupting their current browsing or viewing session. As illustrated in FIG. 2, the contextual notification 210 is presented within the viewing space of user interface 200 to allow a user viewing the user interface 200 to view the current item 206 and information about the item 208 and compare it to the information about the same item 206 as indicated in the contextual notification 210. In some embodiments, users may provide input, such as during a registration step for utilizing features of the contextual browsing assistant service, to specify preferences for a duration of time that the contextual notification 210 will persist in user interface 200 before disappearing. In embodiments, the contextual notification 210 may be presented to a user for a default time window or persist until the user dismisses the contextual notification 210 or interacts with the contextual notification 210.

Figure 3:
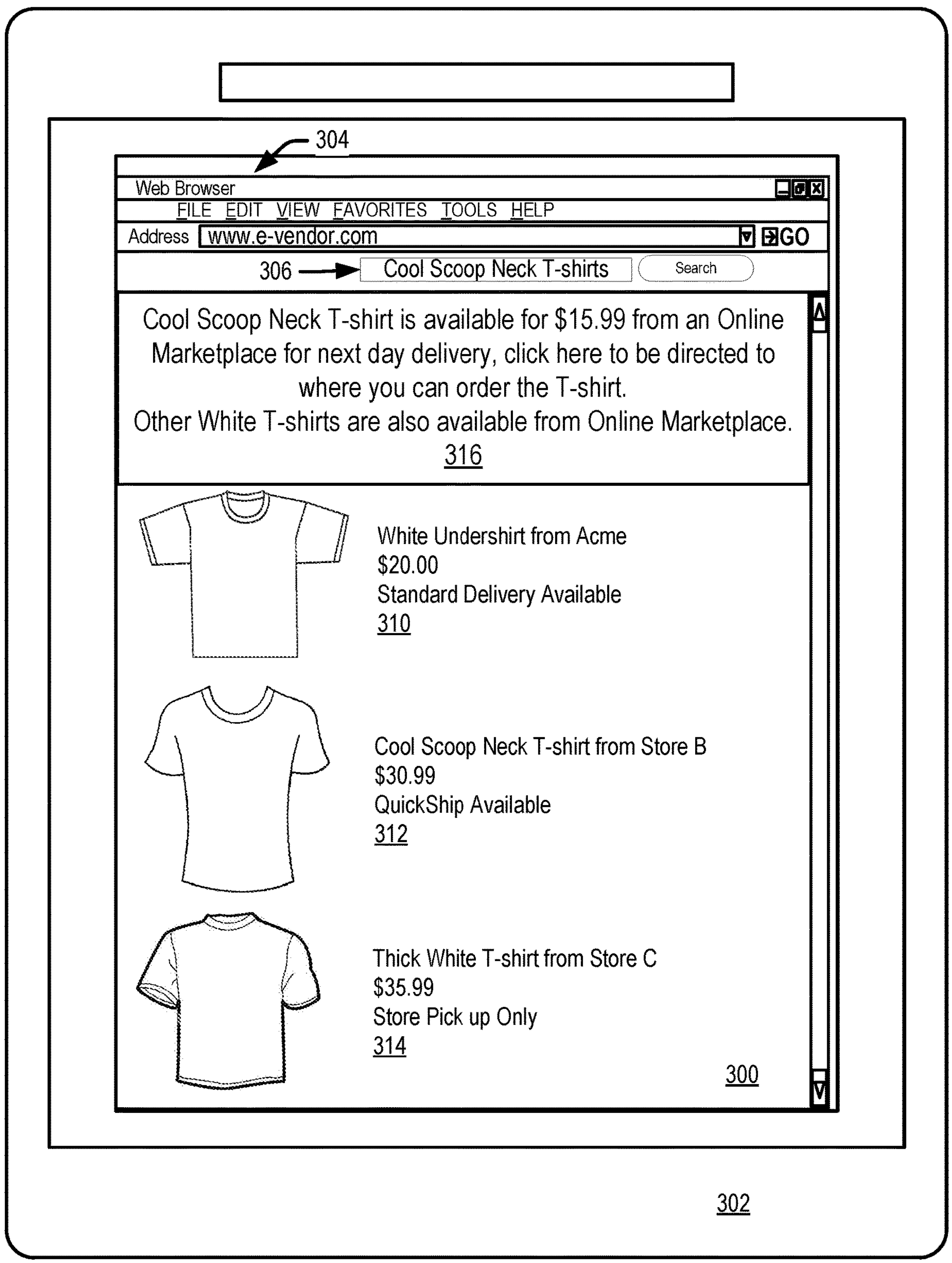
FIG. 3 illustrates an example user interface, via a web browser for a user device, depicting features of a contextual browsing assistant service as described herein, in accordance with at least one embodiment.

FIG. 3 illustrates an example user interface, via a web browser for a user device, depicting features of a contextual browsing assistant service as described herein, in accordance with at least one embodiment. The user interface 300 of FIG. 3 may be presented via a user device 302 (such as a tablet computer device) and present information from a web browser 304 for a particular vendor (e-vendor.com). The web browser 304 may include search functionality 306 for a query provided by a user desiring search results for a particular item from the vendor. For example, FIG. 3 depicts the search query "White T-shirts" as part of the search functionality 306. FIG. 3 illustrates multiple search results 308-314 for the "White T-shirts" query provided to the web browser 304 for "e-vendor.com." The search results 308-314 include images and item details for various white t-shirts offered by e-vendor.com. In embodiments, event data may be obtained by components of the contextual browsing assistant service of the user device 302 and include search queries or activity of searching for items included in 308-314. The event data may be analyzed to identify items being viewed by a user for generation of a contextual notification 316. The obtaining of the event data and identification of items and eventual generation of the contextual notification 316 occur absent the user requesting the contextual notification 316 for comparative shopping purposes. Instead, the event data of the browsing session with web browser 304 is obtained and analyzed to determine if item matches with other associated vendors exist before generation of the contextual notification 316 occurs.

FIG. 3 depicts the contextual notification 316 being presented over the content 308-314 of the web browser 304 as an overlay or content strip configured to be presented as an overlay. The contextual notification 316 may be presented to enable a user viewing the web browser 304 to engage in comparison shopping between the items 308-314 and the item identified in the contextual notification 316. The contextual notification 316 illustrated in FIG. 3 includes information about a particular item of the search results ("Cool Scoop Neck T-shirt") with information that the item is provided by a different vendor ("Online Marketplace") at a better price and for next day delivery. Although the contextual notification 316 includes information about a particular item ("Cool Scoop Neck T-shirt"), embodiments described herein include contextual notifications that include information for multiple items that are matched or offered by a different vendor associated with the contextual browsing assistant service. For example, a user may interact with the contextual notification 316 and be directed to an application associated with the contextual browsing assistant service to be presented with more items similar to the items 308-314 of the search results presented in user interface 300. In some embodiments, the contextual notification 316 may be configured to expand and take up more of the viewing space of user interface 300 upon the user interacting with the contextual notification 316.

Figure 4:
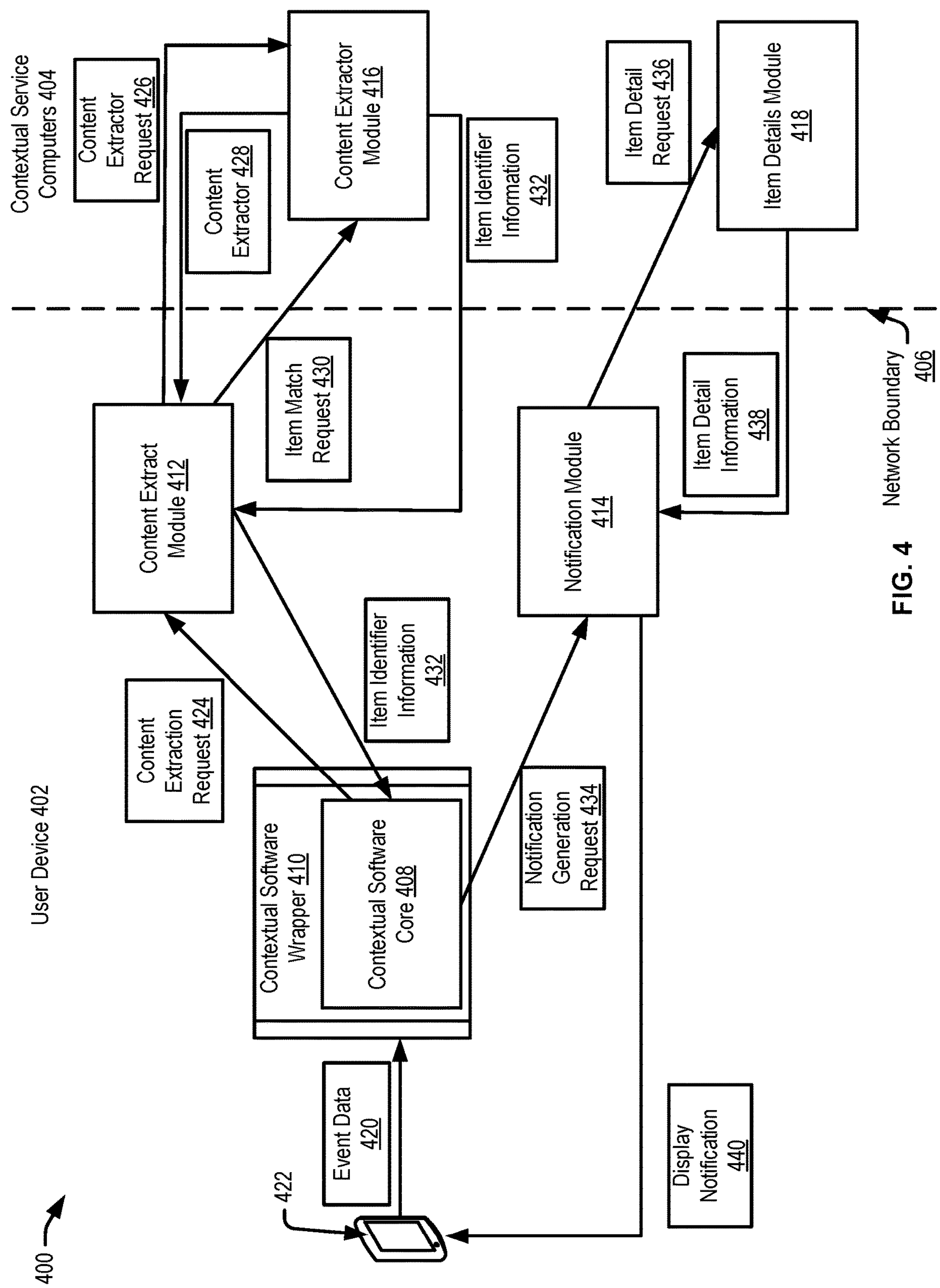
FIG. 4 illustrates an example data flow for a contextual browsing assistant service as described herein, in accordance with at least one embodiment.

FIG. 4 illustrates an example data flow 400 for a contextual browsing assistant service as described herein, in accordance with at least one embodiment. The data flow 400 depicts the interaction between the user device 402 and contextual service computers 404 via a network (represented by the network boundary 406) to implement the features of the contextual browsing assistant service described herein. The user device 402 illustrated in FIG. 4 includes several components (408-414) that communicate with other components (416 and 418) to implement features of the contextual browsing assistant service in accordance with at least one embodiment. The user device 402 includes a contextual software core 408 with an associated contextual software wrapper 410 in communication with a content extract module 412 and a notification module 414. In embodiments, the contextual service computers 404 may include a content extractor module 416 and an item details module 418. Although FIG. 4 illustrates communication between various components of the user device 402 and contextual service computers 404 interacting to implement features of the contextual browsing assistant service, embodiments described herein include all components residing on the user device 402, the contextual service computers 404, or a suitable combination of both.

In embodiments, the data flow 400 includes obtaining event data 420 from a browsing or shopping session occurring on an interface 422 of the user device 402. As described herein, the event data can include a web browsing information, application information, image information, text information, or other suitable information about a viewing/ browsing session of a user. The contextual software wrapper 410 may be configured to consume the event data 420 to identify the format and content of the event data for use by the contextual software core 408. The data flow 400 may include the contextual software core 408 making a content extraction request 424 to the content extract module 412. In embodiments, the content extraction request 424 may be utilized to identify items or services being viewed or browsed by a user in the event data 420. The data flow 400 may include the content extract module 412 requesting content extractors 426 from the content extractor module 416 of the contextual service computers 404.

In accordance with at least one embodiment, the content extractor module 416 may select an appropriate content extractor for content extraction based at least in part on the format identified by the contextual software wrapper 410. In embodiments, a content extractor (content scraper) includes instructions enabling the content extract module 412 to extract specific pieces of information from visible content included in the event data 420. For example, a specific content extractor may instruct the extraction of item identifiers (such as a stock keeping unit (SKU)) from web browser URLs, while another specific content extractor may instruct extracting of an item title or particular text from the content of a user's active window included in the event data. In accordance with at least one embodiment, the content extractor module 416 may return a specific content extractor 428 or a plurality of content extractors to the content extract module 412 for extracting content.

In embodiments, the data flow 400 includes the content extract module 412 making an item match request 430 from the content extractor module 416 in response to extracting the content utilizing the content extractor 428 to identify an item included in the event data 420. In some embodiments, the content extractor module 416 determines if any item matches exist between the items identified in the extracted content and a plurality of items offered by an online marketplace associated with the contextual browsing assistant service. The determination of any item matches may be based at least in part on a comparison of first information about the items identified in the extracted content and second information maintained by the contextual service computers 404 that identifies one or more items offered by the online marketplace associated with the contextual browsing assistant service. In accordance with at least one embodiment, the content extractor module 416 may return item identifier information 432 for any determined matches of the item identified in the extracted content from the event data 420 and the items offered by an online marketplace. The content extract module 412 may provide the item identifier information 432 to the contextual software core 408.

In an embodiment, the data flow 400 includes the contextual software core 408 making a notification generation request 434 to the notification module 414 in response to receiving item identifier information 432 indicating a match between an item identified in the event data 410 and items offered by an associated online marketplace. The data flow 400 may include the notification module 414 requesting item details 436, that include the item identifier information 432, from an item details module 418 of the contextual service computers 404. In embodiments the item details module 418 may be configured to obtain item details and various information about items offered by the associated online marketplace based on item identifier information 432. In some embodiments, the item details module 418 may be configured to provide personalized information about the items based on user information communicated by the contextual software core 408 or notification module 414. The data flow 400 may include the item details module 418 communicating the item detail information 438 to the notification module 414. The data flow 400 may include the notification module 414 generating a contextual notification and presenting or displaying the notification 440 on the user interface 422 of the user device 402. In embodiments, the notification module 414 may verify that no new event data 420 has been received for a user before providing the notification. In some embodiments, the notification module 414 verifies the source of the event data 420 (such as web browser or application) to conform the contextual notification before presenting it via the user interface 422. For example, the contextual notification may be generated as an operating system level notification or as an overlay panel or content strip depending on the source of the event data 420. In some embodiments, the item details module 418 may transmit the item detail information 438 to the user device 402 and/or user interface 422 for presentation to the user absent a notification generation request 434 by the notification module 414. In embodiments, the user interface 422 and user device 402 may receive and process the item detail information 438 for presentation in an appropriate manner.

Figure 5:
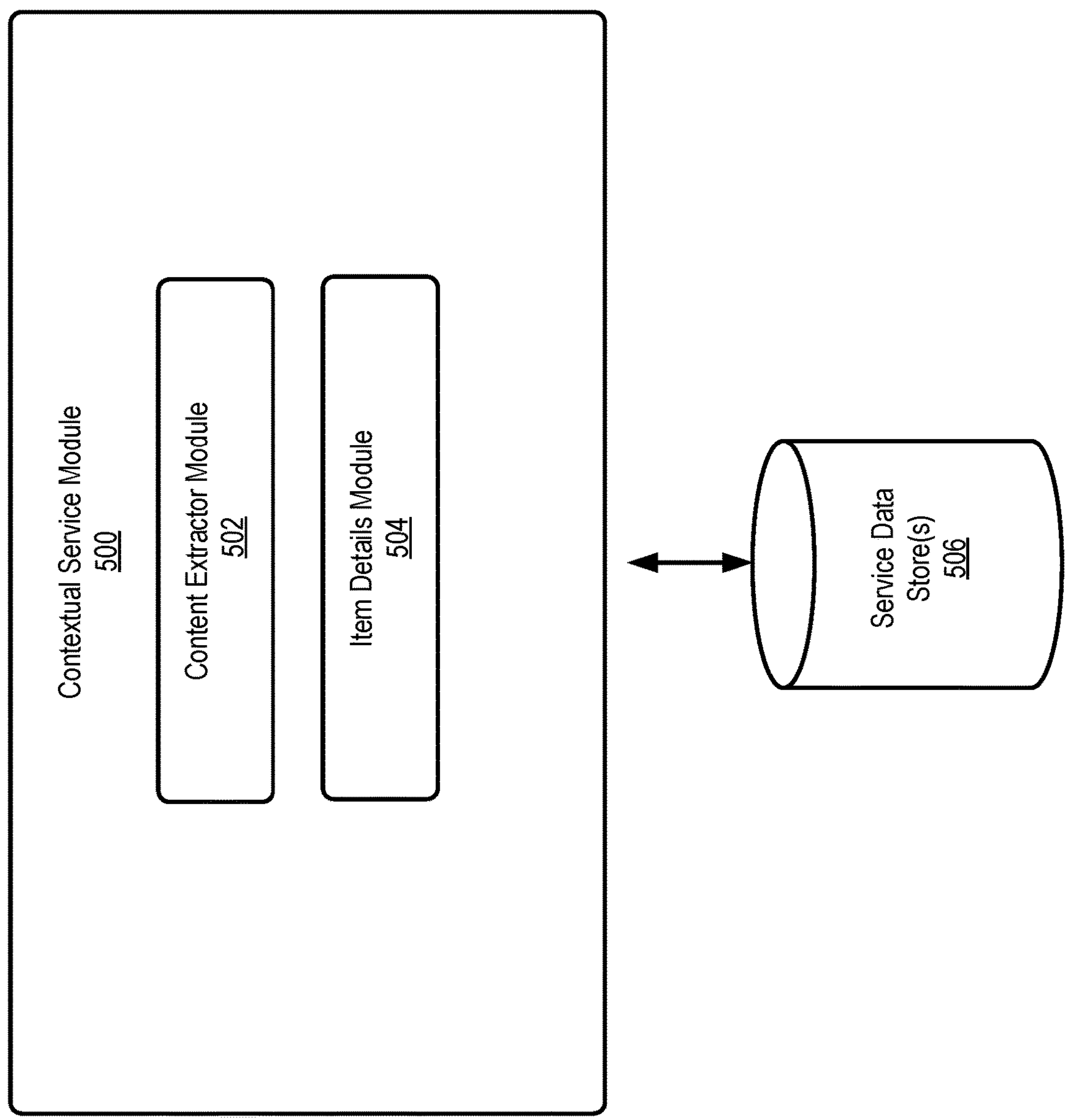
FIG. 5 illustrates components of an example contextual service module that may be utilized in embodiments for implementing features of the contextual browsing assistant service as described herein, in accordance with at least one embodiment.

FIG. 5 illustrates components of an example contextual service module that may be utilized in embodiments for implementing features of the contextual browsing assistant service as described herein, in accordance with at least one embodiment. The contextual service module 500 may include a content extractor module 502, and an item details module 504 in further communication with a service data store 506. The modules 502 and 504 may be examples of modules 416 and 418 from FIG. 4. The modules included within and including contextual service module 500 may be software modules, hardware modules, or a suitable combination thereof. If the modules are software modules, the modules can be embodied on a non-transitory computer readable medium and processed by a processor in any of the computer systems described herein. It should be noted that the described processes and architectures described herein can be performed either in real-time or in an asynchronous mode prior to user interaction. The modules may be configured in the manner suggested in FIG. 5 or may exist as separate modules.

In accordance with at least one embodiment, the contextual service module 500 may be configured to maintain configuration information for the contextual software core residing on user devices. For example, the configuration information of the contextual service module 500 may aid in installing the contextual software core or other components on user devices. The configuration information may be utilized to determine the preferences of the user regarding the contextual browsing assistant service (such as the user turning the features described herein on, opting in, or opting out). In embodiments, the contextual service module 500 may be configured to determine whether a source of the event data is included in a whitelist of sources, origins, or domains for content extractors and item matching as described herein. For example, particular sources, domains, or origins may be specified by the user or an administrator of the contextual browsing assistant service to remove from performing content extract, item matching, and notification generation as described herein. In an embodiment, the contextual service module 500 may be configured to generate and maintain information that identifies user intent derived from the event source data such as particular web sites visited or applications utilized to view particular items. The contextual service module 500 may generate and maintain associate tags for associated partners that are identified in the web sites or applications being viewed by the user and lead to interaction with the contextual notification provided to the user for partner recognition. In accordance with at least one embodiment, the contextual service module 500 may track and maintain information that identifies sequences of item browsing/viewing performed by a user when generating the contextual notifications described herein. This information may be utilized to pre-generate contextual notifications for particular browsing/viewing paths taken by a user.

In accordance with at least one embodiment, the content extractor module 502 may be configured to maintain one or more content extractors for use in extracting content from event data. In embodiments, the content extractor module 502 may be configured to determine item matches between items identified by the context extract module 412, or other components described herein, and items offered by an online marketplace associated with the contextual browsing assistant service. The content extractor module 502 may identify matching items based on the information that is extracted by the context extract module 412 from the user's visible content. The content extractor module 502 identifies matching items or services agnostic to the identity of the user who is viewing the content from which the event data is derived.

In accordance with at least one embodiment, the item details module 504 may be configured to identify item information or item details for matching items as determined by the content extractor module 502. In embodiments, the item details module 504 may identify or determine an identity of the user utilizing information from a user device, information included in the event data, or from the contextual service module 500. The item details or item information may include an item title, item description, a URL for directing a user to a purchase or log-in portal, price information, review or rating information for the item, branding information, and image information for the item.

Figure 6:
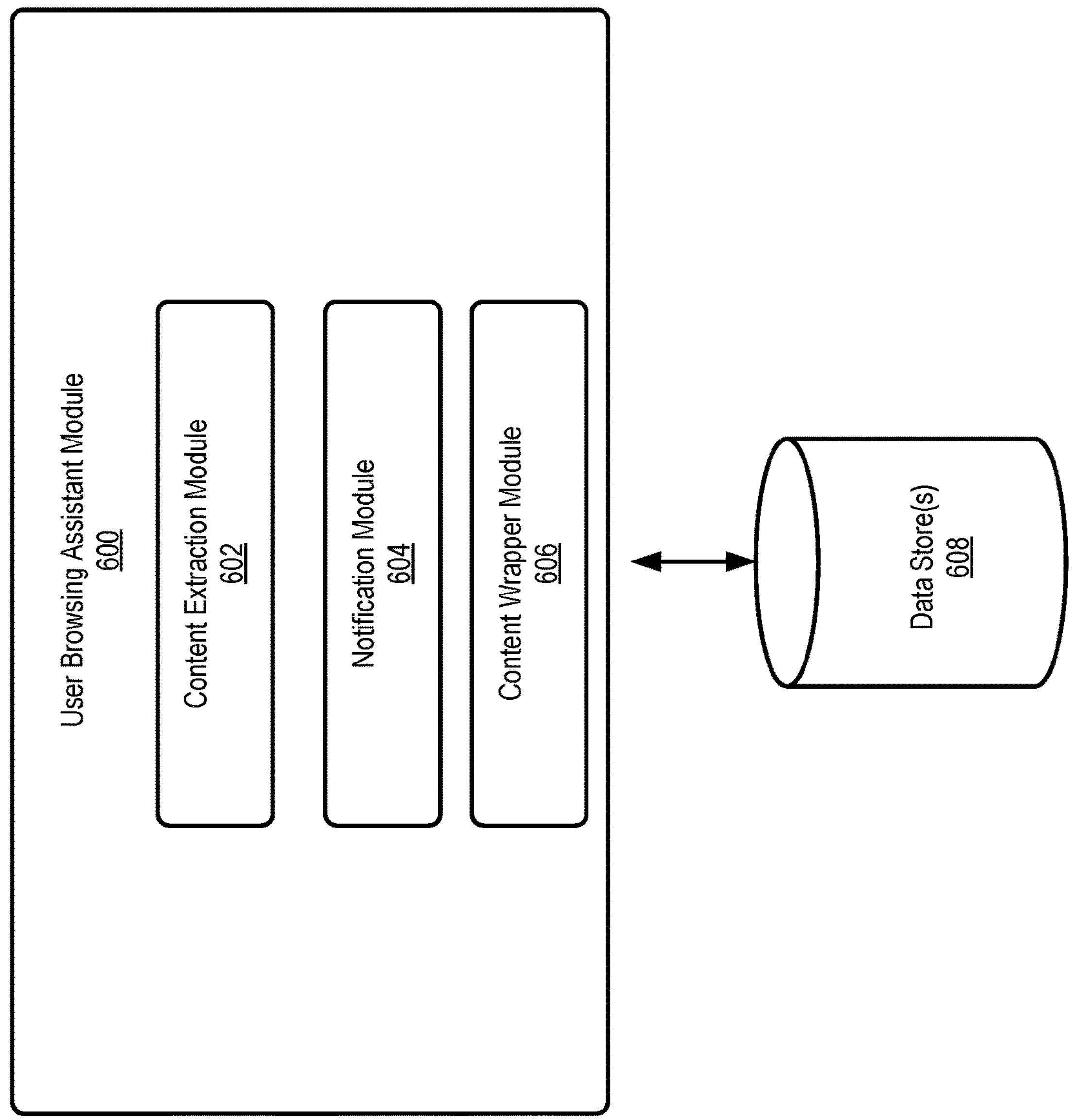
FIG. 6 illustrates components of an example user browsing assistant module that may be utilized in embodiments for implementing features of the contextual browsing assistant service as described herein, in accordance with at least one embodiment.

FIG. 6 illustrates components of an example user browsing assistant module that may be utilized in embodiments for implementing features of the contextual browsing assistant service as described herein, in accordance with at least one embodiment. The user browsing assistant module 600 may include a content extraction module 602, a notification module 604, and a content wrapper module 606 in further communication with a data store 608. The modules 602 and 604 may be examples of modules 412 and 414 from FIG. 4, and modules 600 and 606 may be examples of contextual software core 408 and contextual software wrapper 410. The modules included within and including user browsing assistant module 600 may be software modules, hardware modules, or a suitable combination thereof. If the modules are software modules, the modules can be embodied on a non-transitory computer readable medium and processed by a processor in any of the computer systems described herein. It should be noted that the described processes and architectures described herein can be performed either in real-time or in an asynchronous mode prior to user interaction. The modules may be configured in the manner suggested in FIG. 6 or may exist as separate modules.

In accordance with at least one embodiment, the user browsing assistant module 600 may be configured to maintain a library of application program interface (API) calls for interacting with various components of the contextual browsing assistant service on the user device or the contextual service computers. The user browsing assistant module 600 may be configured to request various information or implement certain features of the contextual browsing assistant service by invoking particular APIs. In embodiments, the user browsing assistant module 600 may determine user preferences for utilizing the contextual browsing assistant. For example, a user may save preferences regarding the service locally on the user device that can be identified before any further action is taken thus saving computer resources of the user device.

In accordance with at least one embodiment, the content extraction module 602 may be configured to make content extractor requests to the content extractor module 502 and utilize the received content extractors for extracting content from the event data processed by the user browsing assistant module 600 and content wrapper module 606. In embodiments, the content extraction module 602 may be configured to request a determination of matching items from the item details module 504 based on the extracted content utilizing the content extractors. The content extraction module 602 may be configured to process information provided by the items details module 504 and determine identification information (such as SKU numbers) for matching items offered by an online marketplace associated with the contextual browsing assistant service.

In accordance with at least one embodiment, the notification module 604 may be configured to request item detail information from the item details module 504 as described herein. The notification module 604 may be configured to generate contextual notifications that include information about matching items offered by an alternate vendor than the vendor and item currently being viewed by a user. The notification module 604 may utilize the item information received from the item details module 504 to generate an appropriate contextual notification. In accordance with at least one embodiment, the notification module 604 may be configured to receive and process input provided by a user interacting with the contextual notification. The notification module 604 may be configured to utilize the user input to generate and maintain a wish list for items included in a contextual notification, and compile and maintain a comparative list of one or more items included in multiple contextual notifications for subsequent comparison shopping. In an embodiment, the notification module 604 may be configured to append information about an item included in the event data that triggered the match of items offered by the different vendor. By appending item information from various vendors to the contextual notification, a user may be presented with an interface element that enables an enhanced browsing and/or comparative shopping experience. The information about the item extracted from the event data may be included and/or appended to other information in the contextual notification as described herein. In embodiments, the notification module 604 may be configured to implement a one-button purchase feature for items included in the contextual notification by communicating with the vendor or online marketplace associated with the contextual browsing assistant service.

In accordance with at least one embodiment, the content wrapper module 606 may be configured to process event data obtained from a viewing or browsing session currently being viewed by a user on a user device to identify a format and content type of the event data and/or session. In embodiments, the content wrapper module 606 may be configured to process and translate API calls associated with and/or included in the event data for use by the user browsing assistant module 600. For example, the content wrapper module 606 may receive and process operating system level event data, which may include specific API calls to software or components of the user device, into API calls that can be understood and utilized by the user browsing assistant module 600.

Figure 7:
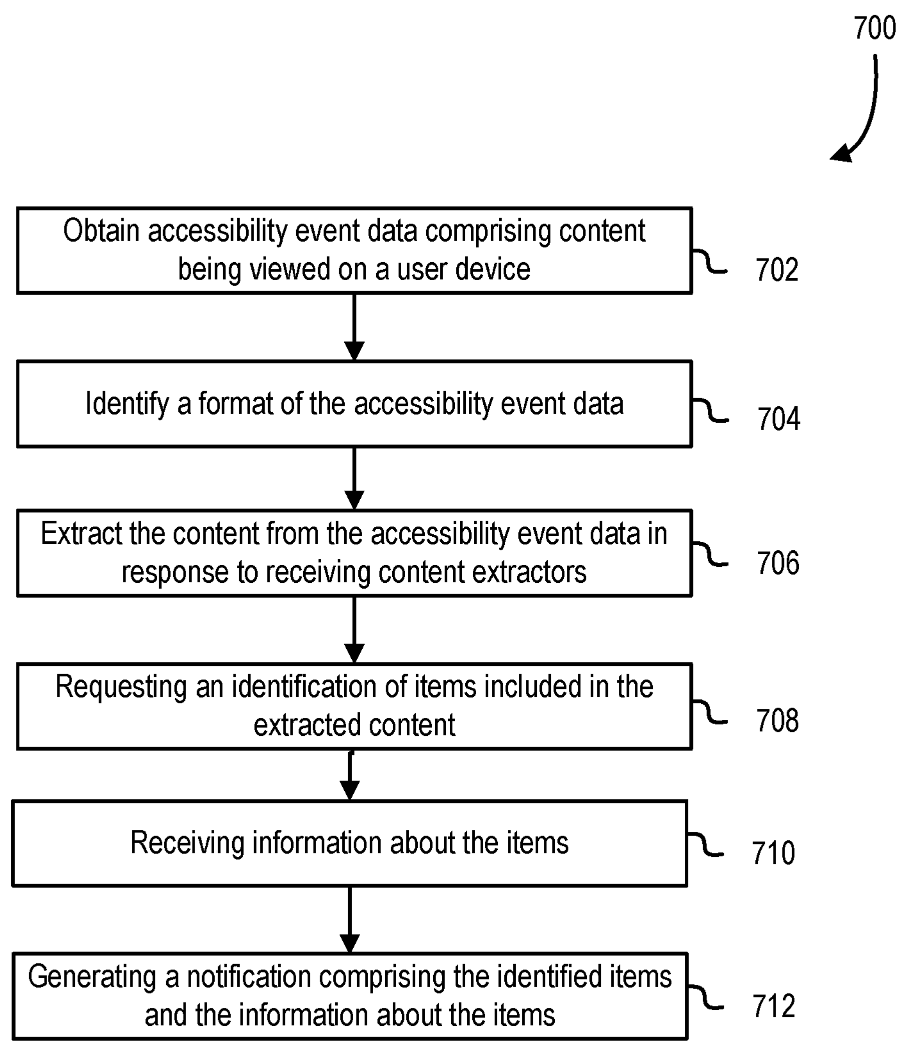
FIG. 7 illustrates an example flow diagram for features of a contextual browsing assistant service as described herein, in accordance with at least one embodiment.
Figure 8:
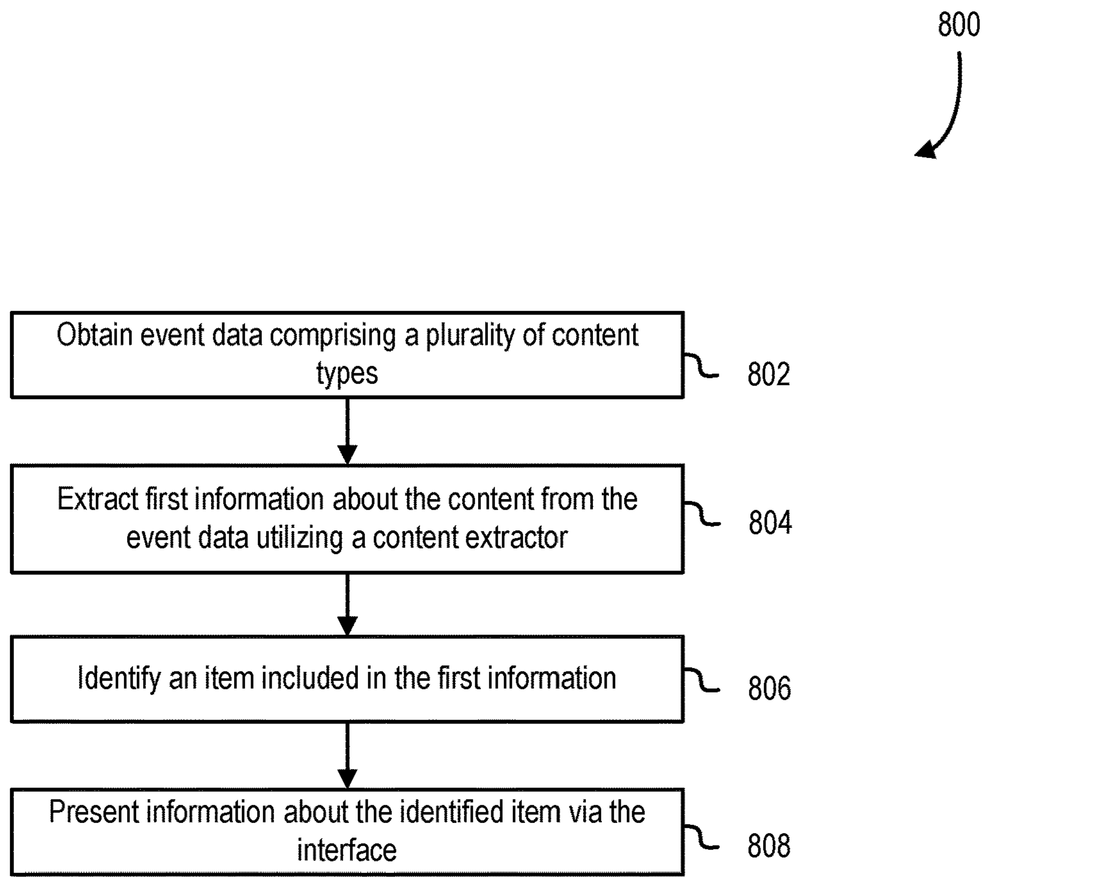
FIG. 8 illustrates an example flow diagram for features of a contextual browsing assistant service as described herein, in accordance with at least one embodiment.

FIGS. 7 and 8 illustrate example flow diagrams for features of a contextual browsing assistant service as described herein, in accordance with at least one embodiment. These processes are illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer executable instructions include routines, programs, objects, components, data structures, and the like that perform particular functions or implement particular data types. The order in which the operations are described is not intended to be construed as a limitation, and any suitable number of the described operations can be combined in any suitable order and/or in parallel to implement the processes.

Additionally, some, any, or all of the processes (or any other suitable processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. As noted herein, the code may be stored on a computer-readable storage medium, for example, in the form of a computer program including a plurality of instructions executable by one or more processors. The computer-readable storage medium may be non-transitory.

In some examples, one or more contextual service computers and user devices (e.g., utilizing at least one of a contextual service module 500, a content extractor module 502, an item details module 504 in communication with service data stores 506, a user browsing assistant module 600, a content extraction module 602, a notification module 604, and a content wrapper module 606 in communication with one or more data stores 608) shown in FIGS. 5 and 6 may perform the processes 700 and 800 of FIGS. 7 and 8. In FIG. 7, the process 700 may include obtaining event data comprising content being viewed on a user device at 702. For example, the event data may comprise a user interface of an application of the user device that is displaying item details for an item from a particular vendor. In embodiments, the event data may include an operating system level accessibility event that is obtained by the user device. As described herein, the contextual software wrapper of the contextual software core may be configured to obtain and process the accessibility event data that can drive the selection of an appropriate content extractor for extracting content being viewed or interacted with on an interface of the user device. The process 700 may include identifying a format of the event data at 704. In embodiments, the content wrapper module 606 may process and consume the event data to identify a format type and content source associated with the event data.

The process 700 may include extracting the content from the event data in response to receiving content extractors at 706. In some embodiments, the content extractors may be requested from and selected by contextual service computers via an available network. The process 700 may include requesting an identification of items included in the extracted content at 708. In some embodiments, the content extractor module 502 may utilize the extracted content to identify any items and provide identification information for said items (such as unique item identifiers or item SKUs) to the components of the user device. The process 700 may include receiving information about the items at 710. In accordance with at least one embodiment, the information about the items includes item details, such as price, images, reviews, as determined by the item details module 504 based on the item identification information. In embodiments, the process 700 may conclude at 712 by generating a notification comprising the identified items and the information about the items for presentation to a user. In accordance with at least one embodiment, the notification module 604 may generate the notification with the above noted information as an operating system level notification for presentation to the user or as a content strip to be presented as an overlay element over a web browser or native application being viewed by a user on the user device.

In accordance with at least one embodiment, the process 800 may include obtaining event data comprising content being presented via an interface at 802. In some embodiments, the event data may include URLs of a web page being viewed by a user of a user device. In embodiments, the event data may comprise a plurality of content types such as an accessibility event from an operating system, a uniform resource locator event, a hypertext markup language event, a plain text event, a native application event, or an image event. The contextual software wrapper of the contextual software core may be configured to obtain and process the obtained event data to identify a proper content extractor to request for each type of content that the event data may comprise. In accordance with at least one embodiment, the event data may be associated with an action taken by a user, via an interface and user device, that resulted in content being presented via the interface of the system such as sending a short message service text, browsing images of the user device. The process 800 may include extracting first information about the content from the event data utilizing a content extractor at 804. In an embodiment, components of a user device may request, receive, and utilize one or more content extractors to obtain as much useful information from the event data that represents the state of the interface being viewed by a user. The process 800 may include identifying an item included in the first information at 806.

For example, an item may be identified by comparing the first information to second information that identifies a plurality of items offered by an online marketplace associated with the contextual browsing assistant service described herein. In some embodiments, contextual service computers may periodically provide information that includes one or more unique item identifiers for matching an item included in the extracted content to offered items from an online marketplace. The process 800 may conclude at 808 by presenting information about the identified item via the interface. As described herein, the notification module 604 may generate a particular type of contextual notification based on the current viewing environment (web browser vs native application) and may modify dimensions or viewing characteristics (such as size, lighting, font) based on the amount of viewing space as determined by a type of user device utilized by a user. Information about the device utilized by the user may be obtained by components of the contextual browsing assistant service residing on the user device or may be provided by a user during a registration step when registering to utilize and install the contextual browsing assistant service described herein.

Figure 9:
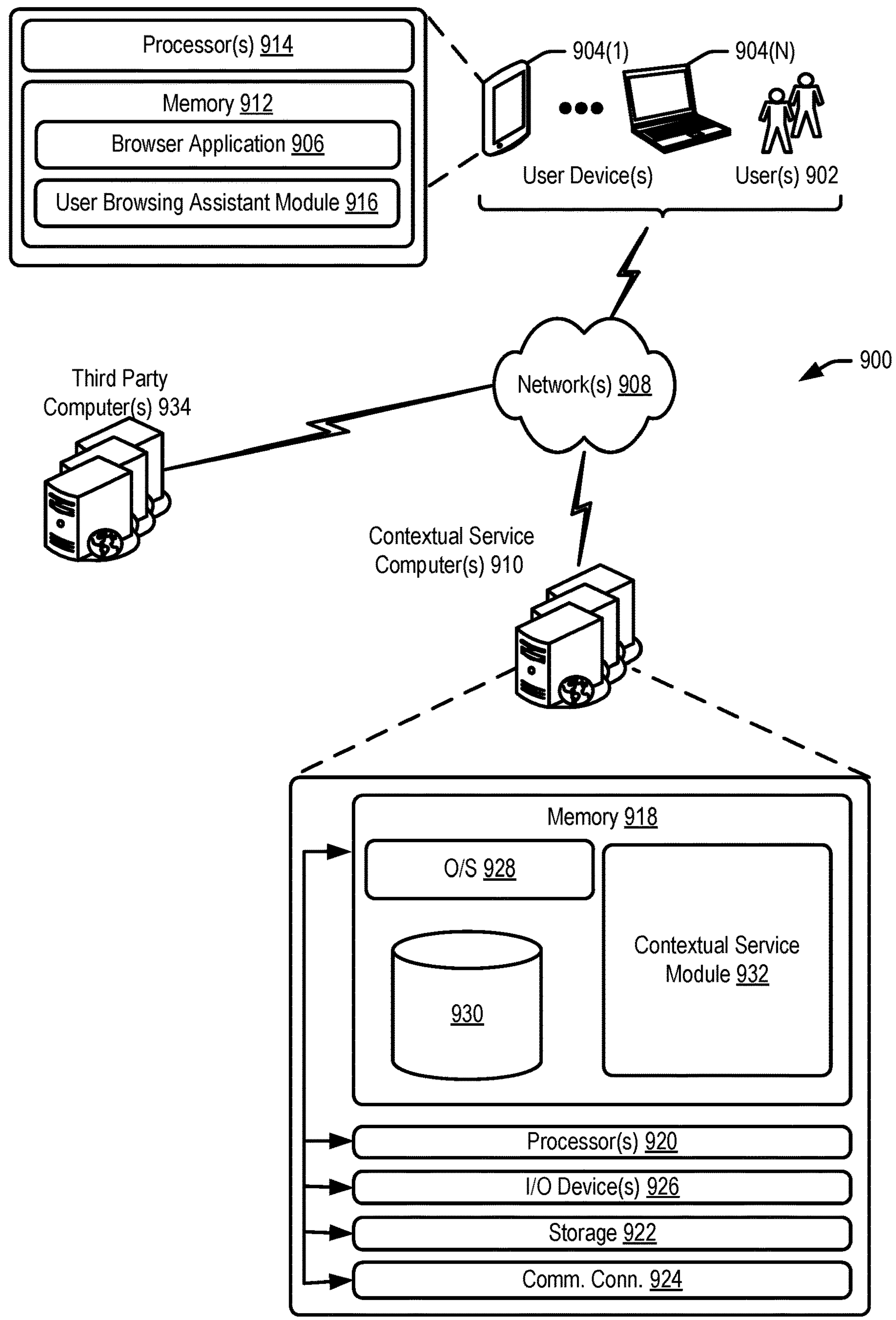
FIG. 9 illustrates an example architecture for implementing a contextual browsing assistant service as described herein, in accordance with at least one embodiment.

FIG. 9 illustrates an example architecture for implementing a contextual browsing assistant service as described herein, in accordance with at least one embodiment. In architecture 900, one or more users 902 (e.g., users) may utilize user computing devices 904(1)-(N) (collectively, user devices 904) to access a browser application 906 (e.g., a network document browser) or a user interface (UI) accessible through the browser application 906, via one or more networks 908 to view or browse for items and/or search for items offered by one or more vendors. The "browser application" 906 can be any suitable browser control or native application that can access and display a web page, a software user interface, a video communication session, or other information. In accordance with at least one embodiment, the user 902 may interact with the browser application 906, via user device 904, to provide input such as by interacting with presented contextual notifications or dismissing the contextual notifications as described herein.

The architecture 900 may also include, one or more contextual service computers 910 that may, in some examples, provide computing resources such as, but not limited to, client entities, low latency data storage, durable data storage, data access, management, virtualization, hosted computing environment or "cloud-based" solutions, electronic content performance management, etc. The one or more contextual service computers 910 may also be operable to provide site hosting, computer application development, and/or implementation platforms, combinations of the foregoing, or the like to the one or more users 902.

In one illustrative configuration, the user devices 904 may include at least one memory 912 and one or more processing units or processor(s) 914. The processor(s) 914 may be implemented as appropriate in hardware, computer-executable instructions, firmware, or combinations thereof. Computer-executable instruction or firmware implementations of the processor(s) 914 may include computer-executable or machine-executable instructions written in any suitable programming language to perform the various functions described herein. The user devices 904 may also include geo-location devices (e.g., a global positioning system (GPS) device or the like) for providing and/or recording geographic location information associated with the user devices 904. The memory 912 may store program instructions that are loadable and executable on the processor(s) 914, as well as data generated during the execution of these programs. Depending on the configuration and type of user device 904, the memory 912 may be volatile (such as random access memory (RAM)) and/or non-volatile (such as read-only memory (ROM), flash memory, etc.). The user device 904 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program modules, and other data for the computing devices. In some implementations, the memory 912 may include multiple different types of memory, such as static random access memory (SRAM), dynamic random access memory (DRAM), or ROM.

Turning to the components of the memory 912 in more detail, the memory 912 may include an operating system and one or more application programs or services for implementing the features disclosed herein including user browsing assistant module 916 (which may be an example of browsing assistant module 600). Additionally, the memory 912 may store access credentials and/or other user information such as, but not limited to, user IDs, passwords, and/or other user information. In some examples, the user information may include information for authenticating an account such as, but not limited to, a device ID, a cookie, an IP address, a location, or the like. In addition, the user information may include a user 902 provided response to a security question or a geographic location obtained by the user device 904.

In some examples, the networks 908 may include any one or a combination of many different types of networks, such as cable networks, the Internet, wireless networks, cellular networks and other private and/or public networks. While the illustrated example represents the users 902 communicating with the one or more contextual service computers 910 over the networks 908, the described techniques may equally apply in instances where the users 902 interact with the one or more contextual service computers 910 via the one or more user devices 904 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer arrangements, etc.).

The browser application 906 may be capable of handling requests from many users 902 and serving, in response, various user interfaces that can be rendered at the user devices 904 such as, but not limited to, a software application user interface, network site, or web page. The browser application 906 can interact with any type of network site that supports user interaction, including social networking sites, electronic retailers, informational sites, blog sites, search engine sites, news and entertainment sites, electronic marketplaces, and so forth. The described techniques can similarly be implemented outside of the browser application 906, such as with other applications running on the user device 904.

The one or more contextual service computers 910 may be any type of computing device such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the one or more contextual service computers 910 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment or distributed computing environment. In some examples, the one or more contextual service computers 910 may be in communication with the user device 904 via the networks 908, or via other network connections. The one or more contextual service computers 910 may include one or more servers, perhaps arranged in a cluster or as individual servers not associated with one another.

In one illustrative configuration, the one or more contextual service computers 910 may include at least one memory 918 and one or more processing units or processors(s) 920. The processor(s) 920 may be implemented as appropriate in hardware, computer-executable instructions, firmware, or combinations thereof. Computer-executable instruction or firmware implementations of the processor(s) 920 may include computer-executable or machine-executable instructions written in any suitable programming language to perform the various functions described when executed by a hardware computing device, such as a processor. The memory 918 may store program instructions that are loadable and executable on the processor(s) 920, as well as data generated during the execution of these programs. Depending on the configuration and type of the one or more contextual service computers 910, the memory 918 may be volatile (such as RAM) and/or non-volatile (such as ROM, flash memory, etc.). The one or more contextual service computers 910 or servers may also include additional storage 922, which may include removable storage and/or non-removable storage. The additional storage 922 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 918 may include multiple different types of memory, such as SRAM, DRAM, or ROM.

The memory 918, the additional storage 922, both removable and non-removable, are all examples of non-transitory computer-readable storage media. For example, computer-readable storage media may include volatile or non-volatile, removable or non-removable media implemented in any method or technology for storage of information such as computer-readable instructions, data structures, program modules, or other data. The memory 918 and the additional storage 922 are all examples of non-transitory computer storage media. Additional types of non-transitory computer storage media that may be present in the one or more contextual service computers 910 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the one or more contextual service computers 910. Combinations of any of the above should also be included within the scope of non-transitory computer-readable media.

The one or more contextual service computers 910 may also contain communication connection interface(s) 924 that allow the one or more contextual service computers 910 to communicate with a data store, another computing device or server, user terminals and/or other devices on the networks 908. The one or more contextual service computers 910 may also include I/O device(s) 926, such as a keyboard, a mouse, a pen, a voice input device, a touch input device, a display, speakers, a printer, etc.

Turning to the contents of the memory 918 in more detail and as was described above in further detail in FIG. 5, the memory 918 may include an operating system 928, one or more data stores 930, and/or one or more application programs or services for implementing the features disclosed herein including a contextual service module 932 (which may be an example of contextual service module 500). In some examples, the one or more contextual service computers 910 may communicate with one or more third party computers 934 to obtain item details, item information, or item identification information.

Figure 10:
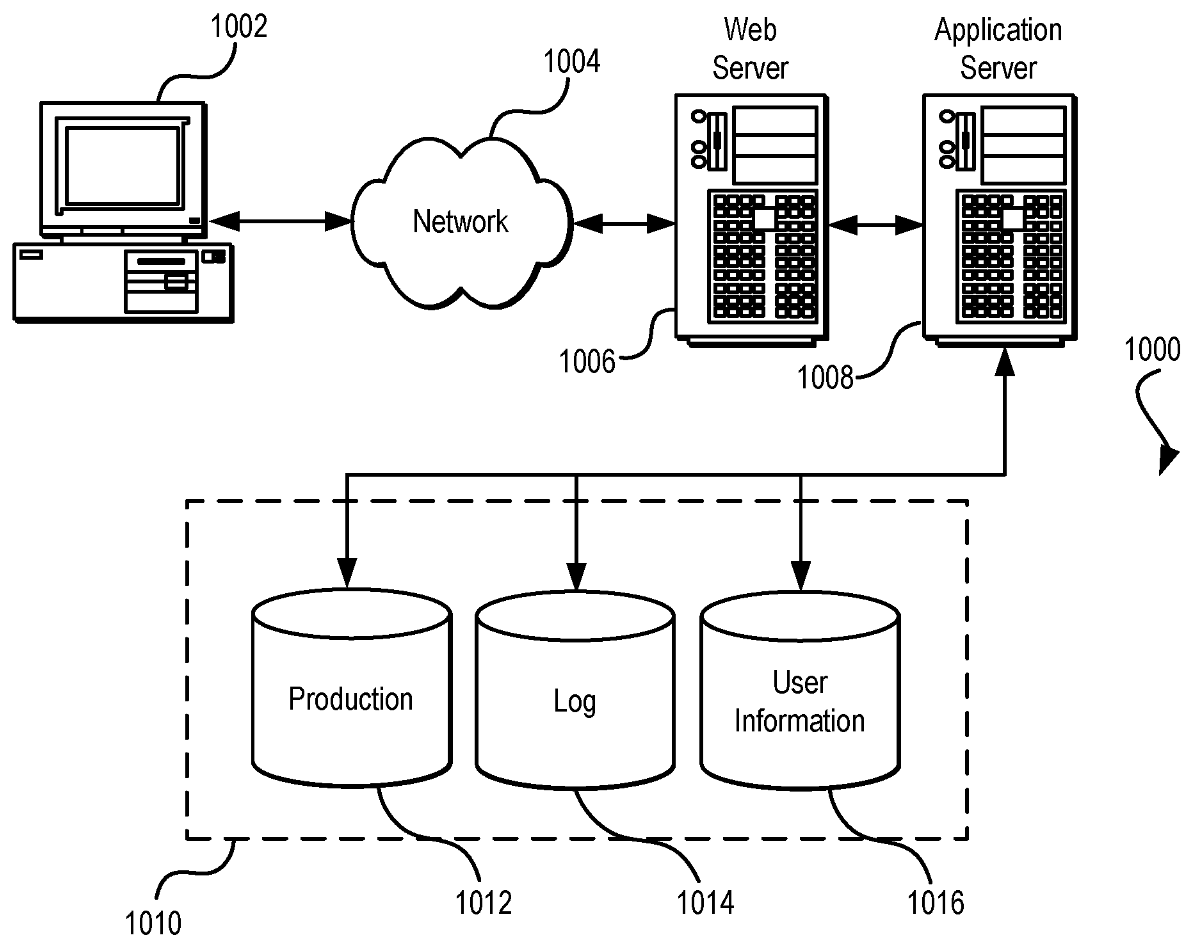
FIG. 10 illustrates an environment in which various embodiments can be implemented.

FIG. 10 illustrates aspects of an example environment 1000 for implementing aspects in accordance with various embodiments. As will be appreciated, although a Web-based environment is used for purposes of explanation, different environments may be used, as appropriate, to implement various embodiments. The environment includes an electronic client device 1002, which can include any appropriate device operable to send and receive requests, messages, or information over an appropriate network 1004 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 1002 and the application server 1008, can be handled by the Web server. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing production data 1012 and user information 1016, which can be used to serve content for the production side. The data store also is shown to include a mechanism for storing log data 1014, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:

presenting, by a user device, content via a user interface of the user device, the content corresponding to items offered by a vendor;

obtaining, by the user device, accessibility event data comprising identifiers of the content being displayed on the user interface of the user device, the accessibility event data obtained from an operating system of the user device;

identifying, by the user device, a format of the accessibility event data based at least in part on a software wrapper of the user device translating one or more program interface calls included in the accessibility event data and operating system level event data associated with the operating system;

extracting, by the user device, the identifiers of the content from the accessibility event data in response to receiving content extractors from a contextual service server, the content extractors received based at least in part on a request to the contextual service server, the request utilizing the format of the accessibility event data, and a content extractor of the content extractors configured to be utilized with a particular type of content that corresponds to a portion of the content;

requesting, from the contextual service server, an identification of the items included in the extracted identifiers, the identification of the items based at least in part on the extracted identifiers and item identifiers maintained by the contextual service server;

receiving, from the contextual service server, first information about the items; and generating, by the user device, a notification comprising second information that identifies that the items are available from another vendor based at least in part on identification of the items identified by the contextual service server and the information about the items, the notification configured for presentation adjacent to the content displayed in the user interface of the user device.

2. The computer-implemented method of claim 1, wherein the items identified by the extracted identifiers are offered by an online marketplace.

3. The computer-implemented method of claim 1, further comprising selecting a particular software wrapper of one or more software wrappers for identifying the format of the accessibility event data based at least in part on a type of the accessibility event data.

4. The computer-implemented method of claim 3, wherein the type of the accessibility event data includes at least one of a uniform resource locator (URL) event, a hypertext markup language (HTML) event, plain text event, a native application event, or an image event.

5. A system comprising:

a processor; and a memory including instructions that, when executed with the processor, cause the system to, at least:

obtain event data comprising a plurality of content types, the event data associated with an action taken by a user resulting in content being presented via an interface of the system, the content corresponding to an item offered by a vendor;

identify a format for the event data based at least in part on a software wrapper translating one or more program interface calls included in the event data and operating system level event data associated with an operating system of the system;

extract first information about the content from the event data utilizing a content extractor, the content extractor selected based at least in part on the format of the event data and a content type of the plurality of content types associated with the content;

identify the item included in the first information based at least in part on a comparison between the first information and second information, the second information identifying item identifiers maintained by a server; and present, via the interface, third information that identifies that the item is available from another vendor based at least in part on the event data, the third information presented adjacent to the content in the interface of the system.

6. The system of claim 5, wherein the third information is configured to enable the user, via the interface, to append the third information to a comparative list of items maintained by the system.

7. The system of claim 5, wherein the instructions when executed with the processor further cause the system to maintain fourth information identifying a path of web pages or applications utilized by the user based at least in part on the event data.

8. The system of claim 7, wherein the third information is pre-generated by the system based at least in part on the fourth information, and wherein presenting the third information is further based at least in part on the event data indicating a particular web page or a particular application.

9. The system of claim 5, wherein the instructions when executed with the processor further cause the system to obtain fourth information identifying user device specifications.

10. The system of claim 9, wherein presenting, via the interface, the third information about the identified item is further based at least in part on the fourth information identifying the user device specifications, the third information presented according to the device specifications.

11. The system of claim 5, wherein identifying the item included in the first information is further based at least in part on utilizing at least one of text parsing or image recognition.

12. A non-transitory computer readable medium storing specific computer-executable instructions that, when executed by a processor, cause a computer system to at least:

presenting, via an interface, first content corresponding to an item offered by a vendor;

obtaining event data comprising the first content via the interface, the event data associated with a plurality of content types;

identifying a format for the event data based at least in part on a software wrapper of a user device translating one or more program interface calls included in the event data and operating system level event data associated with an operating system of the computer system;

requesting, from a contextual service server, a content extractor based at least in part on the format of the event data;

extracting first information about the first content from the event data based at least in part on the content extractor, the content extractor configured to be utilized with a particular content type of the plurality of content types that corresponds to a portion of the first content;

receiving second information about the item included in the first information in response to transmitting the first information about the first content to the contextual service server, the second information about the item identified based at least in part on the first information and item identifiers maintained by the contextual service server;

generating second content that identifies that the item is available from another vendor based at least in part on the received second information about the item, the second content configured to be presented, via the interface, as an overlay of the first content of the event data; and presenting, via the interface, the second content comprising the second information about the item.

13. The computer readable medium of claim 12, wherein the second content is presented, via the interface, as an operating system level event.

14. The computer readable medium of claim 12, wherein the interface is configured to enable a user to dismiss the second content.

15. The computer readable medium of claim 12, wherein the second content is configured to direct a user to an application for ordering the item.

16. The computer readable medium of claim 12, wherein the second content is configured to direct a user to a web page for ordering the item.

17. The computer readable medium of claim 12, wherein the event data is obtained absent a request to generate the second content by a user via the interface.

18. The computer readable medium of claim 12, wherein the computer-executable instructions, when executed by the processor, further cause the computer system to at least: receiving user information about a user viewing the event data from the contextual service server based at least in part on the event data, wherein the second content further comprises the user information about the user.

19. The computer-implemented method of claim 1, wherein obtaining the accessibility event data is based at least in part on obtaining, by the user device, preferences of a user of the user device indicating opting in to generation of the notification.

* * * * *